June 10, 1952

H. H. BAKKEN 2,599,684

SPARKLER FISHHOOK

Filed June 17, 1949

INVENTOR.
Hans H. Bakken
BY Henry J. S. Metzler

AGENT.

Patented June 10, 1952

2,599,684

UNITED STATES PATENT OFFICE 2,599,684

SPARKLER FISHHOOK

Hans H. Bakken, Pueblo, Colo.

Application June 17, 1949, Serial No. 99,597

1 Claim. (Cl. 43—42.24)

The present invention relates to improvements in fish-hooks and more specifically to a new and improved bait fishhook of the class described in my Patent No. 2,441,232, May 11, 1948.

One object of the present invention is the provision of a device of the character described which will sparkle brightly and will vibrate when pulled through the water, thus acting as a highly effective lure for attracting the fish.

Another object of the present invention is the provision of a device of the character described which will conceal the hook itself to all intents and purposes, and which, due to its specific arrangement will appear more like a bait than like a hook.

A further object of the present invention is the provision of a device of the character described which helps holding the fish on the hook after the fish has been caught thereon, thus preventing the fish from wiggling or tearing itself loose.

Still another object of the present invention is the provision of a device of the character described which consists of only three extremely simple parts which can be assembled easily and quickly, so that this device can be manufactured and sold at a very reasonable price.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings.

Similar reference characters refer to similar parts throughout the several views.

Figure 1:
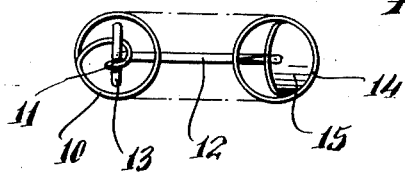
Figure 1 is a top plan view of a preferred embodiment of my invention.
Figure 2:
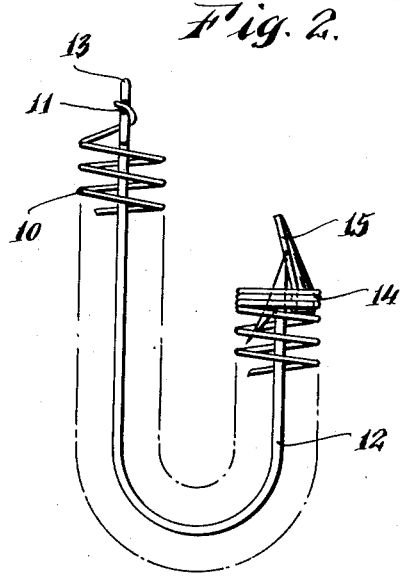
Fig. 2 is a side view.
Figure 3:
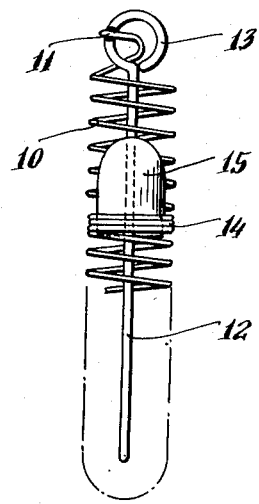
Fig. 3 is a front view of the same.

In the drawing the numeral 10 denotes a longitudinal, thin coiled spring of sparkling material whose treads are in spaced relation to each other, and whose upper end 11 is secured, by means of soldering, welding or the like, to the upper ring-shaped end portion 13 of the longitudinal stem section of a fish hook 12. The stem section of the latter as well as the major portion of its curved hook section are extended through the spring 12, so that only the upper extremity of the pointed hook end protrudes beyond the end 14 of the spring 12. To the end 14 of the spring 12 there is secured, by means of soldering or welding or in any other suitable manner a shell-shaped shield 15 of brightly shining and sparkling metal, plastic material, or the like. The shield 15 protrudes beyond the pointed end of the hook 12, and normally covers and partially conceals the latter. As shown in the drawing, the base portion of the shield 15 is curved at the same radius as the inner sides of the coils of the spring 10 and is extended into the portion 14 of the spring 10, and the shield 15 is upwardly inclined toward, and rests against the hook 12.

When the device is being pulled through the water, the spring 12 vibrates and sparkles, and so does the shield 15, thus attracting the fish, and partially concealing the hook 12. When a fish has been caught on the hook 12, the tension of the spring 12 will tend to force the end 14 of the spring 12 as well as the shield 15 into the fish's mouth or toward its mouth, and will help to hold the hook in place, thus preventing the fish from wiggling or tearing itself loose.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having thus fully described my said invention, what I claim as new and desire to secure by Letters Patent in the United States is:

A sparkler fish hook comprising a hook shaft shaped as an inverted U having parallel shank portions one of which is formed with a loop at its end while the other shank portion has at its end a prong section which is downwardly inclined toward the above first mentioned shank portion, a longitudinal coiled spring through which said hook shaft is extended having one end secured directly to the loop formed at the end of one of said shank portions while its other end terminates at the half-way point of said prong section and encompasses the lower portion of the same, and a sparkling shell member whose base portion is arc-shaped in cross-section on a radius which is equal the inner radius of the coils of said spring being inserted into and secured to that end portion of said spring which encompasses the lower portion of said prong section, said shell member being upwardly inclined toward said prong section and resting against and extending over the upper extremity of said prong section to constitute a shield therefor.

HANS H. BAKKEN.

REFERENCES CITED

The following references are of record in the file of this patent:

UNITED STATES PATENTS

| Number | Name | Date |
|---|---|---|
| 559,293 | Kitchen | Apr. 28, 1896 |
| 675,321 | Brownfield | May 28, 1901 |
| 828,964 | Phelps | Aug. 21, 1906 |
| 875,684 | Biersach | Jan. 7, 1908 |
| 2,098,095 | Hoefler | Nov. 2, 1937 |
| 2,424,599 | Burns | July 29, 1947 |
| 2,441,232 | Bakken | May 11, 1948 |

FOREIGN PATENTS

| Number | Country | Date |
|---|---|---|
| 369,346 | France | Nov. 8, 1906 |